Jan. 27, 1970  E. L. FORYS  3,491,673

ADJUSTABLE SLIT WIDTH SHUTTER

Filed Sept. 15, 1966

Edward L. Forys,
INVENTOR.

BY.

GOLOVE & KLEINBERG,
ATTORNEYS.

3,491,673
ADJUSTABLE SLIT WIDTH SHUTTER
Edward L. Forys, Pasadena, Calif., assignor to Hycon
Mfg. Company, Monrovia, Calif.
Filed Sept. 15, 1966, Ser. No. 579,685
Int. Cl. G03b 9/28
U.S. Cl. 95—57                              3 Claims

ABSTRACT OF THE DISCLOSURE

A focal plane shutter curtain is provided with elastic, slit closure members. A pair of rollers support the curtain. A driving force is applied to one of the rollers and a controllable drag force is applied to the other roller. The amount of drag relative to the restoring force of the elastic closure members determines the width of the shutter slit opening.

---

This invention relates to a shutter device, and more particularly to a device which may be used as a focal plane shutter in a camera.

The ability to accurately control the amount of light or other radiation for transmission thereof, is of great importance in a variety of situations. Control of the passage of visible light in a camera is perhaps the best known of these situations, although other situations involving the transmission of controlled amounts of other types of radiation (whether included in a camera or other types of recording or sensing applications) are attaining increasing significance.

Shutters are well known to the art as mechanisms for controlling the amount of transmitted light radiation. A shutter consists of a mechanism for varying both the area of an opening in a radiation impervious curtain, and the duration that the opening is situated in the radiation path. In a camera, a shutter commonly controls the amount of light reaching the image plane for appropriate exposure of the film.

Two types of shutters are commonly employed in cameras, these being termed "intra-lens" and "focal plane" shutters, respectively. As their names imply, the former type of shutter is located within the camera lens system, while the focal pane shutter is positioned near the focal plane. The intra-lens shutter commonly includes a circular aperture which is variable in diameter, and which must be made to open and close at high speeds in order to ensure light uniformity over the cross section during the exposure interval.

As cameras increase in size, and as their picture taking speeds increase, the mechanism involved in shutter operation of the intra-lens type become increasingly complex. Consequently, the camera lenses may be subjected to intolerable vibrations from the shutter mechanism. Furthermore, since complex intra-lens shutters are expensive, they are infrequently used with cameras having removable and interchangeable lenses.

A camera focal plane shutter, in contrast, includes a strip of a light impervious material which is placed over the film which is to be exposed. The strip has a slit of a precise width cut therein, through which the exposure is to be made. Means are provided for pulling the strip of material across the photographic surface to expose the film for a predetermined period of time depending upon the amount of light admitted by the slit. Various arrangements have been provided in the art for varying the speed at which the slit is pulled across the focal plane, for varying the width of the slit, and for otherwise varying the amount of light to reach the film.

Briefly described, the present invention in a preferred embodiment, provides a shutter which uses a strip of light impervious material having a single slit of controllable width. The strip of material is wrapped around a pair of rollers, each of which may be situated on opposing sides of the film format. The slit is defined by a vertical cut in the strip of material, and the cut ends of the strip are connected by a pair of elastic or spring members, one being at the bottom and the other being at the top. Motor means are provided to drive one of the rollers at a constant rotational speed, thereby pulling the strip in a first direction. Means are provided for applying a drag force to the other roller.

The first roller pulls upon the spring members, against the drag force of the second roller. The spring members elongate in a manner dependent upon their spring constant until the spring force equals the drag force. Elongation of the spring members produces a widening of the slit. Therefore, by controlling the magnitude of the drag force on the second roller, the width of the slit may be controlled.

Various means may be employed for applying the drag force to the second roller. For example, controllable, torque-resistive devices may be coupled to the second roller with respect to its axis of rotation; alternatively frictional devices may be employed to interact with a surface which relates to the surface of the drum. Many types of apparatus may be used for controlling the amount of the drag force applied to the second roller; for example, electrical, hydraulic, pneumatic and mechanical control devices may be used, each of which are well known in the art.

Electromechanical devices for both applying and controlling the amount of the drag force may be preferable in most applications. Such devices could include a friction brake operating through a solenoid, and electromagnetic torque-resistive devices such as a magnetic damper, clutch or brake. All of these devices are well known in the art. Since only a single, adjustable slit is required in the strip of light impervious material, or curtain, instead of a plurality of slits of different widths, the distance between the rollers may be as small as the width of the film format. Obviously, if the curtain is wholly placed in the radiation path the curtain includes a wide, window aperture which admits radiation to the slit. The equipment associated with the shutter of the present invention easily lends itself to compactness, and the mechanisms associated therewith are uncomplicated.

The device which controls the magnitude of the drag force on the second roller may be calibrated in terms of slit width. A control knob may be provided either on the camera or at a position remote from the camera in order to manually change the width of the slit. In addition, the width of the slit may be automatically controlled in response to ambient light conditions, such as by coupling the control device to a servo-motor which responds to the output of a photoelectric device.

It is therefore an object of the present invention to provide a focal plane shutter which includes a single slit of adjustable width.

It is another object of the present invention to provide a focal plane shutter including a slit whose width can be accurately controlled.

It is a further object of the present invention to provide easily controllable means for accurately varying the width of the exposure slit of a focal plane shutter.

It is still another object of the present invention to provide a focal plane shutter having an adjustable exposure slit which can be remotely controlled.

It is yet a further object of the present invention to provide a focal plane shutter having an adjustable slit whose width can be automatically controlled.

The novel features which are believed to be characteristic of the invention, both as to organization and method of operation, together with further objects and advantages thereof will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
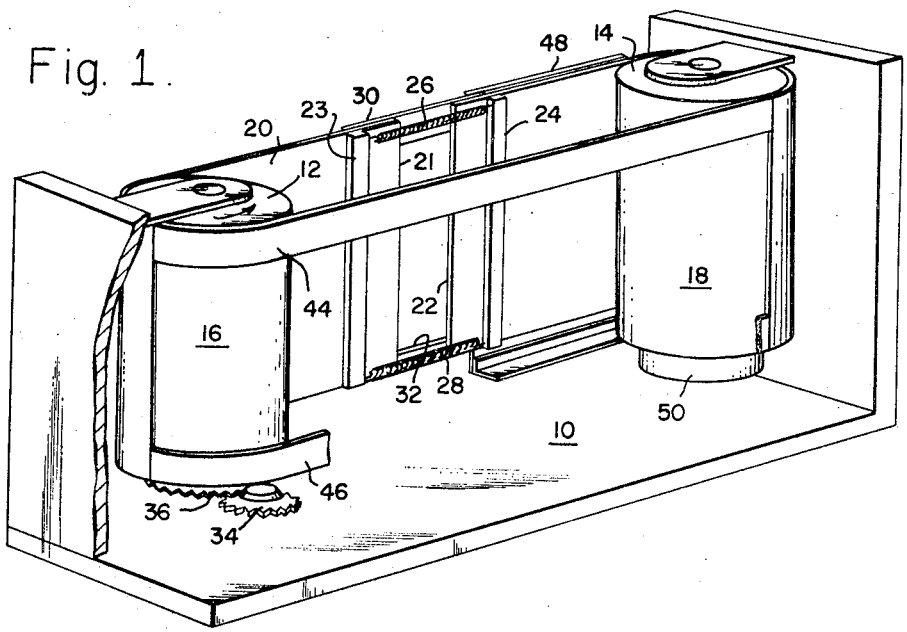
FIG. 1 is a perspective of a preferred embodiment of a shutter according to the present invention.
Figure 2:
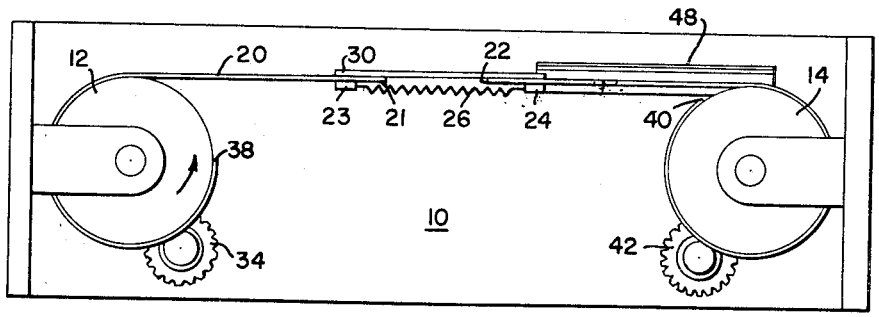
FIG. 2 is a plan view of an alternative embodiment of a shutter according to the present invention.
Figure 3:
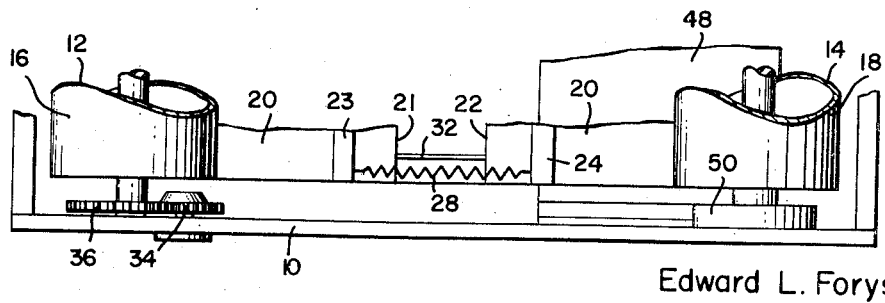
FIG. 3 is a front cut-away view of the preferred embodiment of FIG. 1 and the alternate embodiment of FIG. 2, showing components common to both embodiments.

The present invention may be best described by consideration of FIGS. 1, 2 and 3, taken together. A base 10, which may be constructed from any material which might be advantageous in a particular camera such as a plastic or metal, supports first roller 12 by a conventional bearing arrangement (not shown). A second roller 14 is similarly supported in the base 10. The rollers 12, 14 have outer surfaces 16, 18, respectively, of a material which is suitable to provide an appropriate friction surface for advancing a curtain 20.

The curtain 20 is divided to form a first end 21 and a second end 22, defining two parallel sides of a slit. Attached to the curtain 20 and parallel to the ends 21, 22 are a first "end" piece 23 and a second "end" piece 24, which are connected together by tension members 26, 28, shown as springs having equal length and spring constants, so that the end pieces 23, 24 remain parallel to each other.

The distance separating the ends 21, 22 define an exposure slit. The springs 26, 28 are positioned so that the slit is normally closed. The top and bottom of the slit are defined by elastic strips 30, 32.

A motor or other driving means 34 (shown here only as an output gear) is provided to drive the first roller 12 through a drive gear 36. Alternative driving means may be provided; for example, the roller 12 may itself be a motor having a surface 16. In such a case, the motor is wound so as to rotate upon its axis, which is supported by the base 10.

When the roller 12 is caused to rotate in a counterclockwise direction, it will pull the curtain 20 across the focal plane of a camera. By applying an appropriate amount of drag to the second roller 14, the slit opens until the spring force equals the drag, allowing incident light to pass through the slit and expose the film.

In the preferred embodiment of FIG. 1, the curtain 20 is joined together around the rollers 12, 14 by a pair of bands 44, 46. The bands 44, 46 allow the curtain 20 to be "continuous," so that after exposure of the film, the slit is pulled around the first roller 12, the second roller 14 and reappears in a starting position for a succeeding exposure. The opening in the curtain, defined by the end of the curtain 20 and the bands 44, 46, is provided to allow transmission of light through the slit during exposure. Any slack in the bands 44, 46, produced by widening of the slit, may be "taken up" by techniques well known in the art.

In the alternative embodiment of FIG. 2, the ends 38, 40 of the curtain 20 are each attached to their respective rollers 12, 14. Provision is made for reversing the direction of travel of the curtain 20, after exposure of the film, to return the slit to a starting position. For example, a second driving means may be connected to the second roller 14, indicated by an output gear 42. When the curtain is returned, the first roller 12 is permitted to run free and the slit remains closed.

It should be noted that, in both embodiments, a second curtain 48 may be provided behind a portion of the curtain 20 for capping purposes. The second curtain 48 is caused to cover the film format after the slit in the first curtain 20 has passed the format, and the second curtain 48 may be made to remain in this position until the slit is reinstated to its starting position. Means for accomplishing the movement of the second curtain 48 are well known in the art. The capping curtain 48 is necessary only if a drag is continuously applied to one of the rollers, thereby holding the slit open.

Drag means, for example a magnetic damper 50, are coupled to the second roller 14 so as to produce a drag force in a clockwise direction upon the second roller 14. Alternative drag means may be provided, such as a friction brake coupled to the second roller 14 and operable through a solenoid. Other torque-resisting mechanisms may be employed, all of which are well known in the art.

The width of the slit in the curtain 20 may be adjusted as follows. When the roller 12 is caused to rotate in the counterclockwise direction, the first curtain end piece 23 will move to the left as viewed in the drawings. A drag force in the clockwise direction, upon the second roller 14, will cause a resistance in the second end piece 24 to movement toward the left. Consequently, the springs 26, 28 will be elongated in an amount dependent upon the drag force and the spring constant. The adjusted slit is then pulled across the film format by the rotating first roller 12. The magnetic damper 50 may be adjustable to provide a wide range of drag forces to the second roller 14, and an adjustment control (not shown) coupled thereto may be calibrated in terms of slit width. The adjustment may be applied manually, either at the camera or at a remote position with respect to the camera. Alternatively, the adjustment may be automatically controlled by coupling the input of the magnetic damper 50 to a photoelectric transducer through a servomotor.

Thus, there has been shown in several embodiments a camera focal plane shutter including a single exposure slit whose width can be remotely and accurately controlled. Other embodiments of the present invention and modification of the embodiments herein presented may be developed without departing from the essential characteristics thereof.

Accordingly, the invention should be limited only by the scope of the claims listed below.

What is claimed as new is:

1. A primary shutter to be removably interposed in the path of radiation comprising:
   a first and a second roller having axes positioned in parallel to one another;
   a curtain member positioned to move upon said first and second rollers upon rotation thereof, said curtain member having first and second ends;
   elastic means connecting said first and second ends for defining an exposure slit therebetween;
   means connected to said first roller for rotating said first roller to move said curtain member in a first direction; and drag means connected to said second roller for applying a drag force to said second roller to resist rotational motion applied by said curtain member;
whereby said elastic means provides a force to balance said applied drag force thereby controlling the width of said exposure slit between said first and second ends.

2. The apparatus of claim 1, above, wherein said elastic means are positioned with respect to said first and second ends such that said exposure slit is normally maintained in a closed radiation-excluding position in the absence of an applied drag force.

3. The apparatus of claim 1, above, further including a secondary shutter arranged to move with said primary shutter to cover a film after exposure by said primary shutter.

References Cited

UNITED STATES PATENTS

| 2,424,439 | 7/1947 | Doyle | 95—57 |
| 3,116,670 | 1/1964 | Ball | 95—10 |

JOHN M. HORAN, Primary Examiner